United States Patent [19]

Eble et al.

[11] Patent Number: 5,104,226
[45] Date of Patent: Apr. 14, 1992

[54] DEVICE FOR EVALUATING WRINKLES IN A DOUBLE ROLLED SEAM

[75] Inventors: Bernard Eble; Brian A. Pangburn, both of Casa Grande, Ariz.

[73] Assignee: Abbott Laboratories, Abbott Park, Ill.

[21] Appl. No.: 716,190

[22] Filed: Jun. 17, 1991

[51] Int. Cl.⁵ .............................................. G01B 9/08
[52] U.S. Cl. .................................... 356/391; 356/397; 356/237
[58] Field of Search ............... 356/388, 391, 392, 393, 356/397, 237

[56] References Cited

FOREIGN PATENT DOCUMENTS 146803 9/1983 Japan ................................. 356/237

OTHER PUBLICATIONS

WACO/MK 2000 Seam Projector, Bulletin No. 810; Wilkens-Anderson Company (undated).
21 CFR 113.60.

*Primary Examiner*—F. L. Evans
*Attorney, Agent, or Firm*—Lonnie R. Drayer; Donald O. Nickey

[57] ABSTRACT

A seam projector has a seam holding device attached to the base portion of the seam projector. The seam holding device has a lever arm which is pivotally attached to the base portion of the seam projector. The seam holding device has a seam guide attached to the lever arm such that the seam guide is aligned with a mirror head on the side of the seam projector when the lever arm is oriented vertically. A nomograph may be overlayed on the projection screen of the seam projector for quantitatively evaluating the severity of wrinkles which appear on the projection screen.

10 Claims, 8 Drawing Sheets

DEVICE FOR EVALUATING WRINKLES IN A DOUBLE ROLLED SEAM

FIELD OF THE INVENTION

The present invention relates generally to a device for evaluating the quality of a can, and more particularly to a device for evaluating wrinkles in a double rolled seam located at the junction of a can body and end of a can.

BACKGROUND OF THE INVENTION

A three piece metal can has a cylindrical can body and two circular ends, with the ends joined to the can body by double rolled seams. When a food product is packaged in such a metal can it is necessary to periodically check for wrinkles in the double rolled seams joining the ends to the can body because the severity of the wrinkles is an indicator of the degree of sealing of a container. The severity of the wrinkles is judged not by the number of wrinkles in a seam, but by the greatest height of any single wrinkle in the seam. Inadequate sealing of a can containing a food product could lead to spoilage of the contents. In the production of cans intended for containing low acid foods periodic visual evaluation of the severity of wrinkles in double rolled seams is required by the Federal Food and Drug Association in 21 C.F.R. 111.60 (Apr. 1, 1990 Edition).

BRIEF DESCRIPTION OF THE DRAWINGS

The features of the present invention which are believed to be novel are set forth with particularity in the appended claims. The present invention, both as to its structure and manner of operation, may best be understood by referring to the following detailed description, taken in accordance with the accompanying drawings in which:

DETAILED DESCRIPTION OF THE INVENTION

Figure 1:
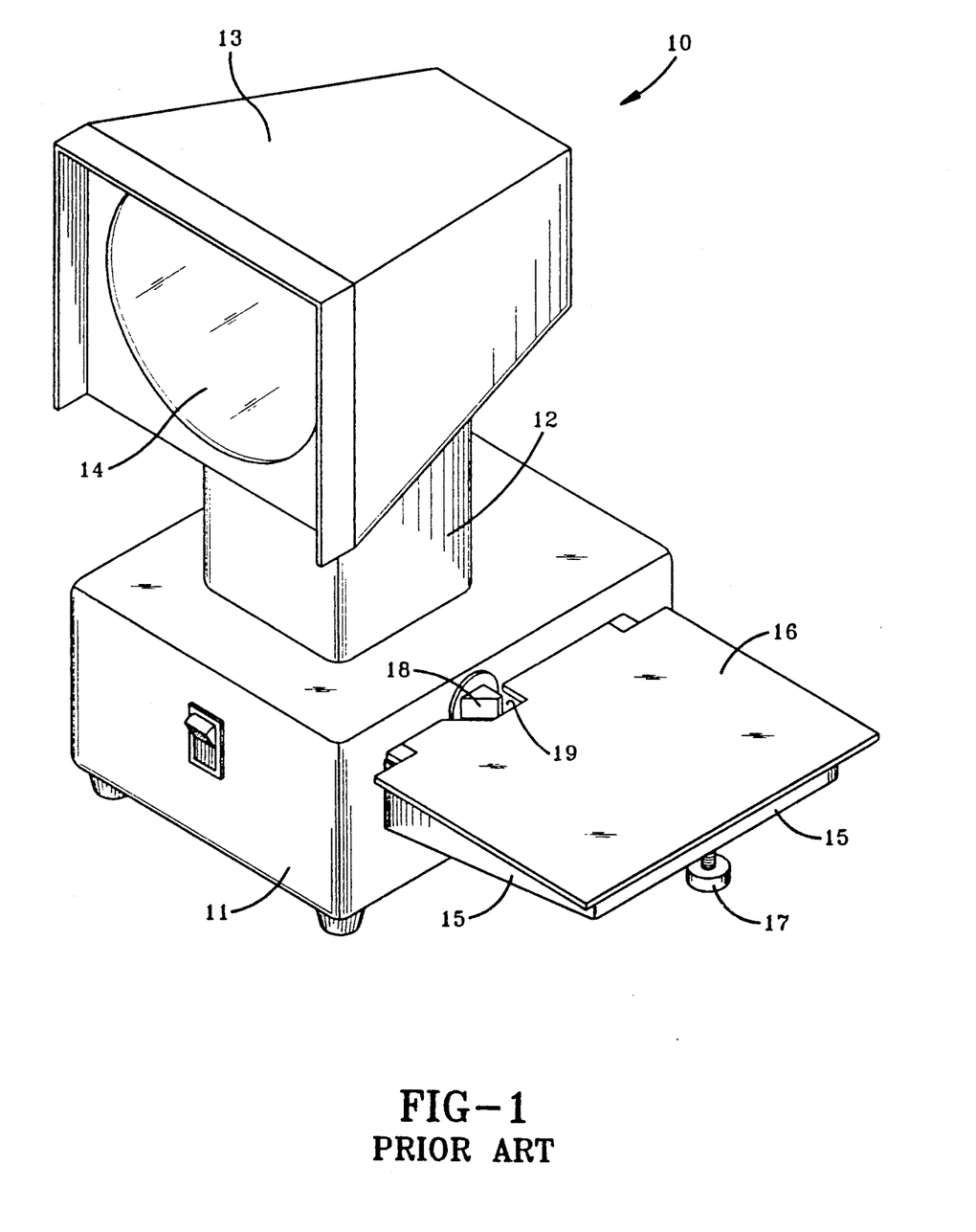
FIG. 1 is a perspective view of a seam projecting device according to the prior art.
Figure 2:
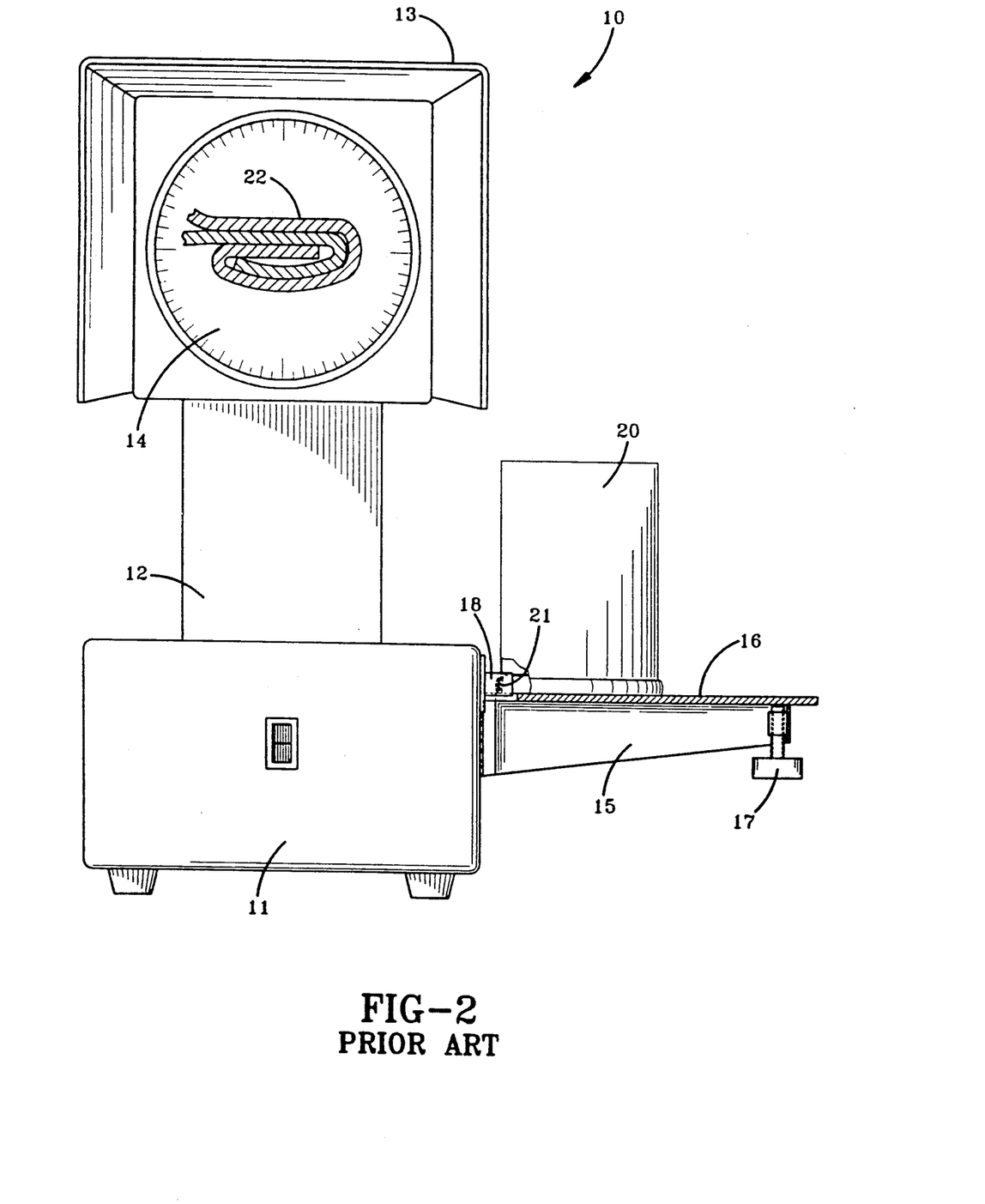
FIG. 2 is a front elevation view, partially in section, of a seam projecting device according to the prior art.

A double rolled seam is the part of a can which is formed by joining the cylindrical body of a can with an end of the can by means of interlocking hooks. A double rolled seam consists of three thicknesses of the end component and two thicknesses of the can body spin rolled together to form a hermetic seal. A cross-section of a double rolled seam 22 is illustrated in FIG. 2. The best double rolled seams are those which closely adhere to specified measurements including proper allowance for normal commercial range variation found in steel plate and allowable variations in the can manufacturing process. The quality of a double rolled seam cannot be judged simply by measuring the physical dimensions of the seam, expert visual examination is also extremely important. For example, all of the measurements may be within allowable tolerances, yet a visibly incorrect seam condition, such as an excessive cover hook wrinkle, may indicate the need for adjusting the seam making equipment. One known method of visually examining a double rolled seam is to use a seam projector. A prior art seam projector 10 is shown in FIGS. 1 and 2 and has a base portion 11 with a columnar support member 12 extending upwardly therefrom to a housing member 13 having a projection screen 14 in one of the walls thereof. A frame member 15 extends from one of the walls of the base portion 11 to support a removable flat plate 16. An adjusting screw 17 is used to adjust the orientation of the flat plate 16 in order to optimize the position of the object which will be viewed on the projection screen 14. A mirror head 18 is located on one of the sidewalls of the base portion 11, and is disposed within a notch 19 in the flat plate 16.

The intended use of a prior art seam projector known in the prior art is to support a can 20 on the flat plate 16 with an exposed cross section of a double rolled seam 21 disposed in close proximity to the mirror head 18 such that an image 22 of the seam is projected onto the projection screen 14. In practicing the best mode of the present invention a WACO/MK 2000 seam projector, available from WILKENS-ANDERSON COMPANY, 4525 West Division Street, Chicago, Ill. 60651, was employed in conjunction with the seam holder which is disclosed herein.

Figure 11:
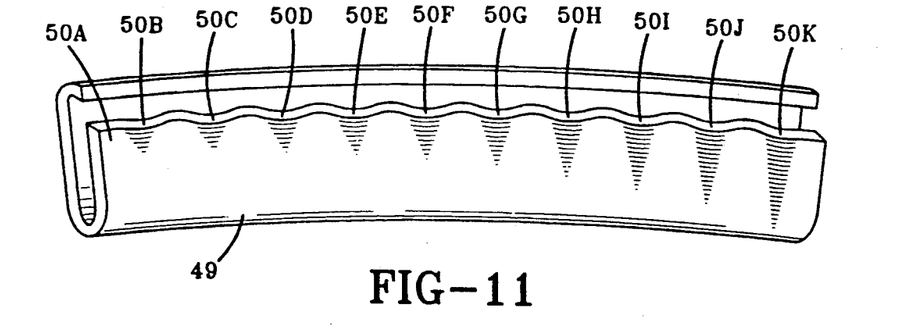
FIG. 11 is a pictorial representation of a cover hook from a double rolled seam.

Referring next to FIG. 11, a cover hook 49 is the part of a double rolled seam which is formed from the curl of the end of the can. A cover hook wrinkle 50B-50K is the waviness on the inside of the cover hook, and generally indicates a loose seam. The degree of wrinkle severity is judged not by the frequency of wrinkles which appear around the seam, but by the greatest depth that any single wrinkle extends into the cover hook. Until now the visual evaluation of wrinkles in a double rolled seam has been essentially a judgment call made using the naked eye or a magnifying glass. Since a wrinkle is evaluated by viewing a side of a seam, the prior art projector in its prior art configuration, which projects only a cross-section of a seam, is not practical for evaluating wrinkles. However, the present invention allows a prior art seam projector to be adapted for practical use in evaluating cover hook wrinkles.

Figure 3:
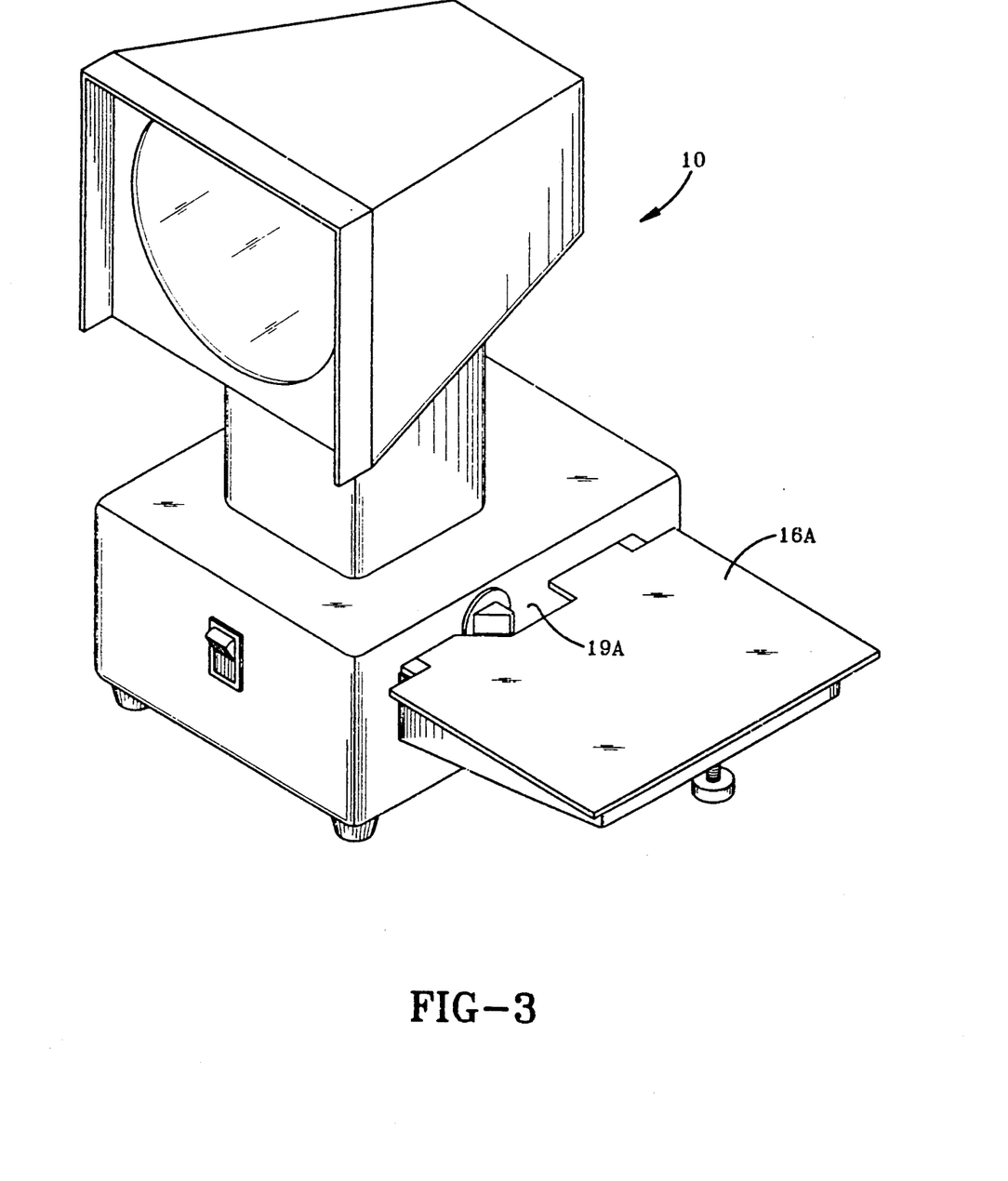
FIG. 3 is a perspective view of the seam projecting device shown in FIGS. 1 and 2, which has been modified to accept a device according to the invention.

With reference to FIG. 3, one of the modifications which must be made to a prior art seam projector 10 in order to accommodate the evaluation of seam wrinkles is to enlarge the notch 19A in the supporting plate 16A to allow the disposition of a seam holding device in close proximity to the mirror head on the sidewall of the base of the projector. In the best mode the notch was modified to have an overall depth of about ¾ inch and to extend for a distance of about 2 inches from the mirror head.

Figure 4:
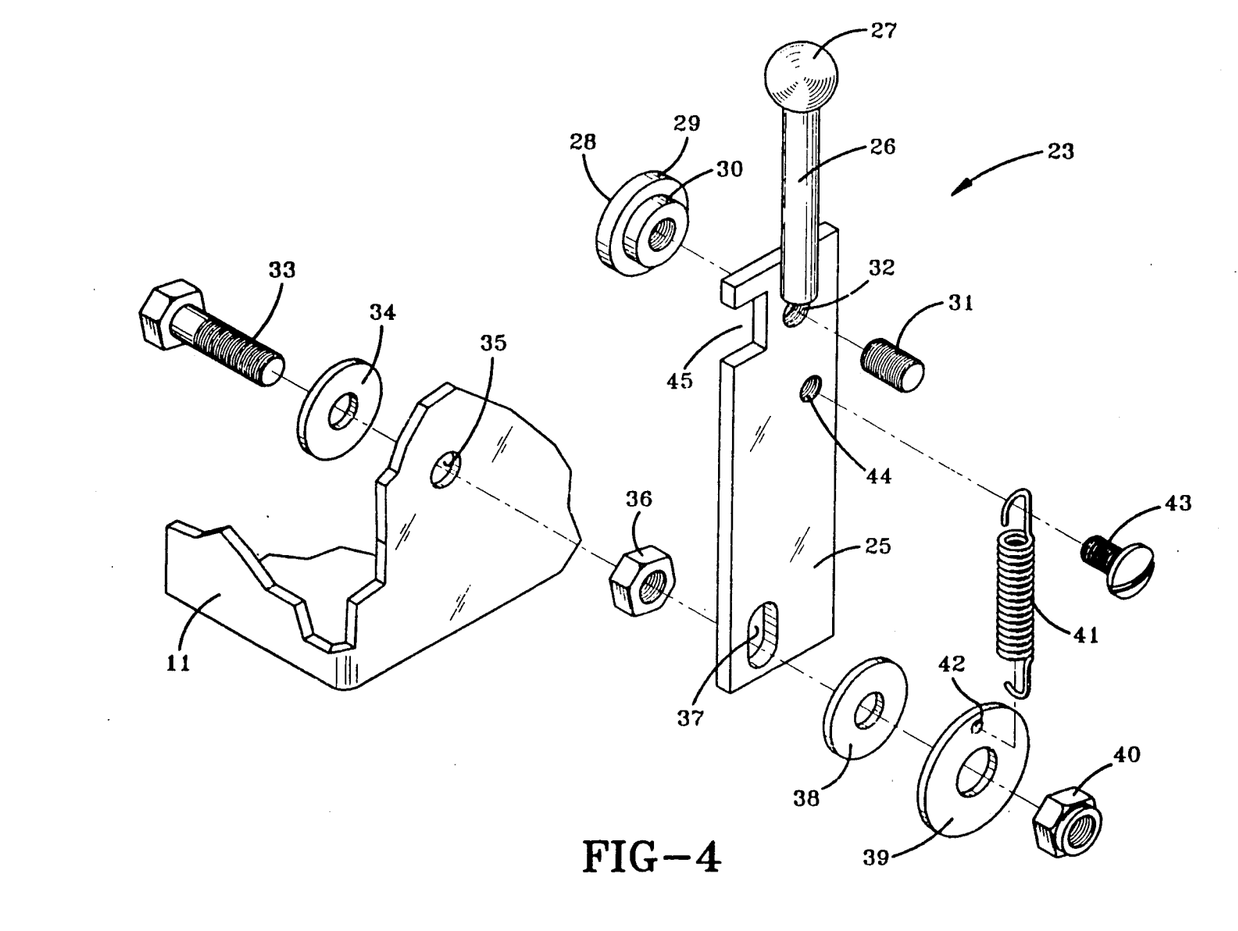
FIG. 4 is an exploded view of a device according to the invention.
Figure 5:
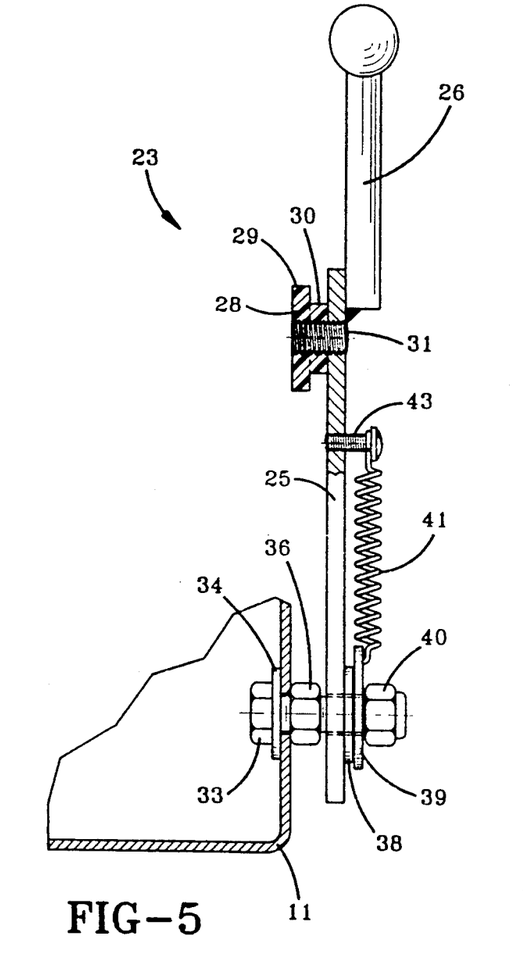
FIG. 5 is a fragmentary front view, partially in broken section, of a device according to the invention.
Figure 6:
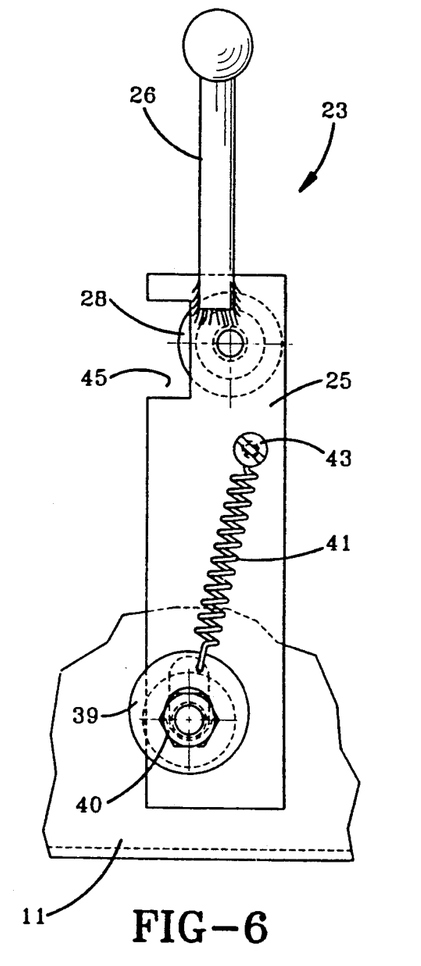
FIG. 6 is a fragmentary side view of the device shown in FIG. 5.

Referring next to FIGS. 4-9 there are shown a variety of views of a seam holding device 23 in accordance with the present invention. FIG. 4 is an exploded view which shows the manner in which one embodiment of the seam holding device may be assembled and attached to the base portion 11 of a seam projector. FIGS. 5 and 6 are fragmentary front and side views showing an assembled seam holding device 23 pivotally attached to a sidewall of the base portion 11 of a seam projector.

A lever arm 25, in the embodiment illustrated as in the form of a plate has a handle 26 attached thereto by a suitable means of attachment, such as welding. A sphere 27 is disposed at the top of the handle for convenience in gripping the handle. It is understood that the handle is an extension of the lever arm and that this subassembly may comprise a single piece, and this subassembly will hereinafter be referred to simply as a lever arm. Seam guide 28 which has stepped diameters 29, 30 is threadably attached to the lever arm by means of a threaded stud 31 which extends through the lever arm via a threaded hole 32. The lever arm has a notch 45 therein which is vertically aligned with the seam guide 28, and accommodates the mirror head when the lever arm is oriented substantially vertically in its operative position. A working embodiment was made wherein the overall dimensions of the metal plate 25 were: (a) thickness about 0.13 inch, (b) overall height about 3.5 inches, and overall width about 1.00 inch. The handle 26 including the sphere 27, extended about 2 inches beyond the end of the plate, so that the overall length of the lever arm was about 5.5 inches. In the working embodiment threaded stud 31 was welded in place to the lever arm, such that a plastic seam guide 28 could be easily replaced in order to accommodate a variety of sizes of seams.

The lower portion of the lever arm is attached to the base portion 11 of the seam projector, most preferably to a sidewall of the base portion, by means for attachment which allows the lever arm to pivot in a vertical plane with the pivot point being below the mirror head 18. A bolt, which is a pivot member, 33 passes through a flat circular washer 34 and a hole 35 in the sidewall of the base portion of the seam projector on which the mirror head is located. A nut 36 retains the bolt 33 securely in place with the shaft of the bolt projecting horizontally outwardly from the base portion of the seam projector. In a working embodiment a 1¼×¼ inch bolt and mating hardware were used for attaching the lever arm to the projector.

The lever arm has an elongated slot 37 therethrough, with the slot extending longitudinally with respect to the lever arm. In the working embodiment the elongated slot had an overall length of about 0.5 inch and a width of about 0.25 inch. The lever arm is slid onto the bolt 33 with the shaft of the bolt extending through the elongated slot. A pair of flat circular washers 38, 39 are then slid onto the shaft of the bolt. A locking nut 40 loosely secures the lever arm and washers onto the shaft of the bolt such that the lever arm and washers may pivot about the bolt. In the working embodiment the locking nut 40 was a metal nut with a nylon insert having threads which mate with the threads of the bolt 33.

Figure 7:
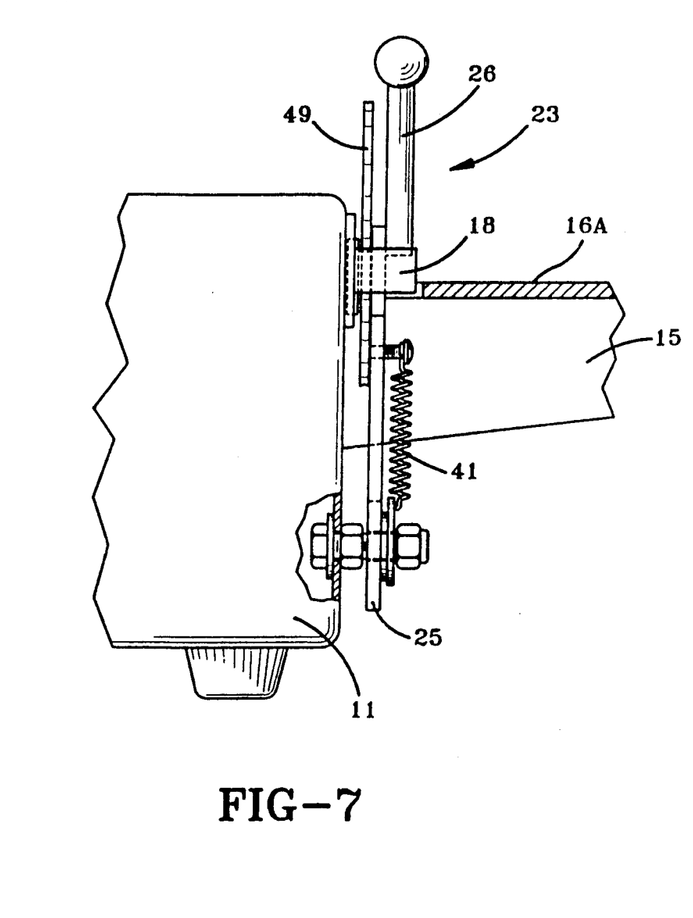
FIG. 7 is a fragmentary front elevation view of a device according to the invention attached to a seam projecting device.
Figure 8:
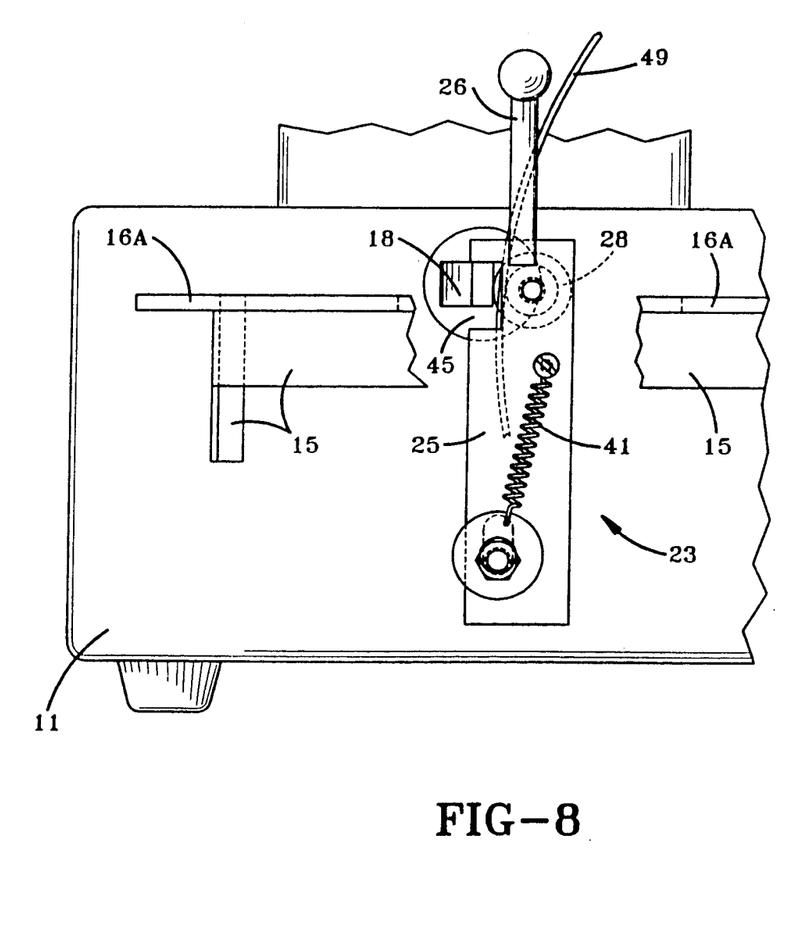
FIG. 8 is a fragmentary side elevation view of the device according to the invention attached to a seam projecting device.
Figure 9:
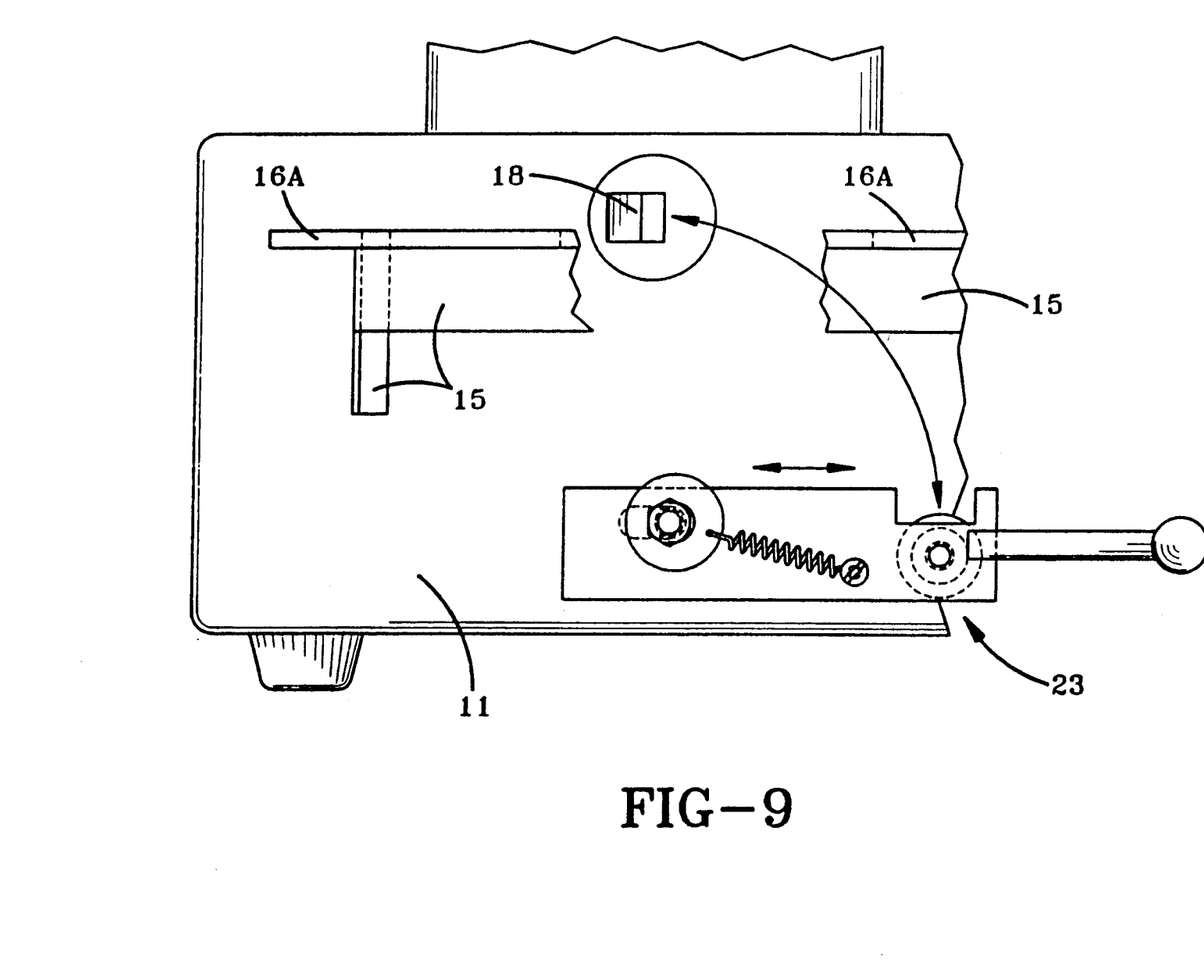
FIG. 9 is another fragmentary side elevation view of the device according to the invention attached to a seam projecting device with the arm displaced from the position shown in FIG. 8.
Figure 10:
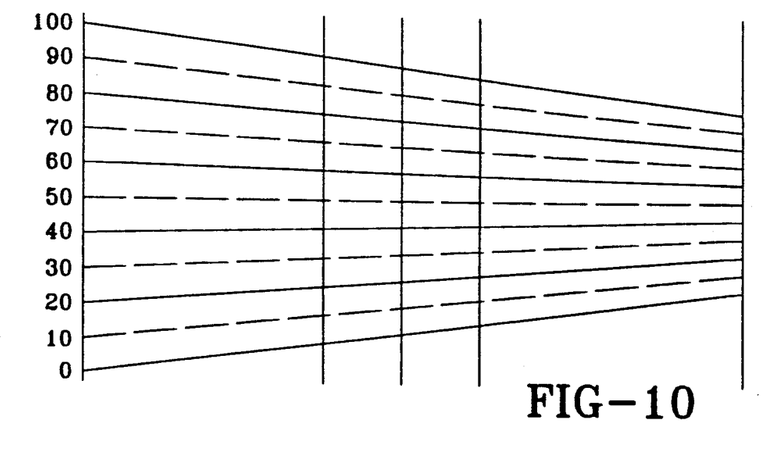
FIG. 10 is a representation of a nomograph used as an overlay in evaluating wrinkles.

The flat circular washer 38 which is nearer to the lever arm has a smaller diameter than the flat circular washer 39 which is further from the lever arm. It is understood that a single piece having two stepped diameters could be substituted from the two washers. A tension member, preferably a coil spring 41, extends along the lever arm from the area of the pivot point to a fixed point disposed about midway between the ends of the entire lever arm. Preferably the coil spring is made of stainless steel. In the best mode a hook at the lower end of the coil spring 41 extends through a small hole 42 in the larger diameter washer 39. The smaller diameter washer 38 acts as a spacer to facilitate this connection of the coil spring near the pivot point of the lever arm. A hook at the other end of the coil spring is secured to the lever arm by a screw 43 which is threadably secured in a threaded hole 44 in the lever arm. The lever arm may be moved into its operative position by pulling it in a direction away from the pivot member 33 and rotating it about the pivot member until the upper edge of the notch 45 rests upon the top of the mirror head 18, as shown in FIGS. 7 and 8. The longitudinal slot 37 in the lever arm and the coil spring 41 facilitate this movement of the lever arm.

Figure 5A:
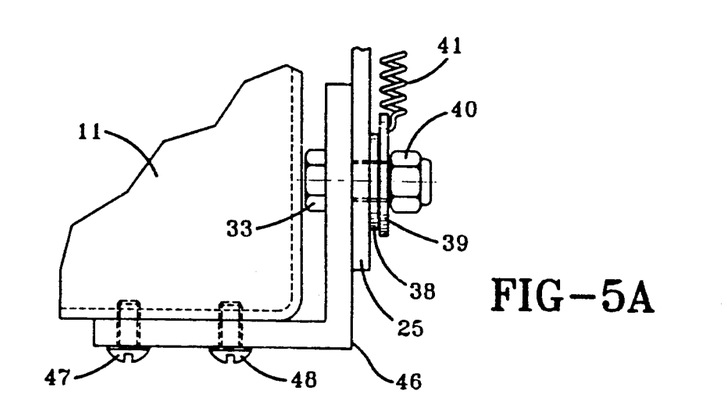
FIG. 5A is a fragmentary front view of an alternative embodiment of a device according to the invention.

An alternative means for pivotally attaching the lever arm 25 to the base portion 11 of a seam projector is illustrated in FIG. 5A. An "L" shaped mounting member 46 is secured to a bottom wall of the base portion of a seam projector by means for attachment such as screws 47, 48 which are threadably attached to the bottom of the base portion of a seam projector. A bolt 33 extends through the mounting member and the elongated slot in the lever arm, with the washers 38, 39, locking nut 40, and tension member 41 attached in the manner described above with reference to FIGS. 4, 5 and 6. An advantage of this embodiment is that access to the interior of the base portion of the seam portion is not necessary, and in some instances this may simplify the assembly process.

The use of a device according to the present invention for evaluating seam wrinkles may be best explained with reference to FIGS. 7-12. In FIGS. 7 and 8 the seam holding device 23 is shown oriented substantially vertically in its operative position, and in FIG. 9 the seam holding device is shown in its storage position. It is an advantage of the present invention that the seam holding device may be pivoted to be below the removable flat plate 16A, by exerting a slight force longitudinally and radially as indicated by the arrows in FIG. 9, and allow the seam projector to be used for evaluating a cross section of a seam in the manner known in the prior art.

The cover hook 49 of a seam is removed from a can by sawing or any other suitable method. The seam holding device 23 is moved into its operative position. The cover hook 49 is placed on the seam guide 28 such that the cover hook is oriented substantially vertically in the region of the mirror head 18, with the wrinkles facing the mirror head. The seam projector is turned on, and preferably the room lighting is dimmed to improve the visibility of the image projected onto the screen of the seam projector. The cover hook 49 is passed by the seam guide and the mirror head until a wrinkle which is of interest appears on the screen. At that time a nomograph of the type illustrated in FIG. 10, which is transparent plastic with a pattern thereon, is held in front of the projection screen. As used herein and in the claims a "nomograph" is understood to mean a graphic representation that comprises several lines marked off to scale and arranged in such a way that by using a straightedge to connect known values on two lines an unknown value can be read at the point of intersection with another line. In this instance the known values are the top and bottom of the cover hook and the unknown value is the percentage of the height of the cover hook that is wrinkle free. The nomograph comprises ten lines, labeled as 0-100, with the vertical distance between next adjacent lines being equal to ten percent of the vertical distance between the top and bottom lines at that location.

Figure 12:
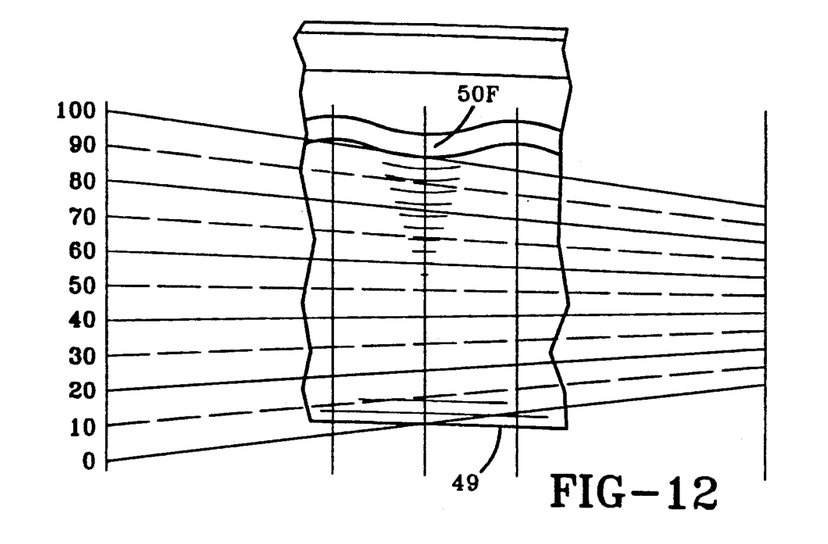
FIG. 12 is a pictorial representation of an image that may appear on the projection screen when the invention is used for evaluating wrinkles in a double rolled seam.

Referring next to FIG. 12 there is shown a pictorial representation of the image of a cover hook 49 having a wrinkle 50F therein, as it might appear on the projection screen. The top line (100) of the nomograph is aligned with the top of the image of the cover hook and the bottom line (0) of the nomograph is aligned with the bottom of the cover hook, at the location of the wrinkle. The line 50F which is nearest the bottom of the wrinkle is determined, and the number of lines (5) below that line is counted. The tightness of a seam is determined by multiplying the number of lines counted by ten percent. In the example represented in FIG. 12 the seam would have tightness rating of 50. An unwrinkled seam, as illustrated at 50A in FIG. 11, has a righting rating of 100. If the tightness rating of a seam is below a predetermined level, for example 70%, the seam making equipment may need to be adjusted and if the seam tightness is too low the cans may not be suitable for containing food products.

While certain representative embodiments and details have been described for the purpose of illustrating the invention, it will be apparent to those skilled in the art that various changes and modifications may be made therein without departing from the spirit or scope of the invention.

We claim:

1. A device for evaluating wrinkles in a double rolled seam comprising:
    (a) a seam projector comprising a base portion having a mirror head located on a sidewall thereof; and
    (b) a seam holding device comprising a lever arm which is attached to said base portion of said seam projector by means for attachment which allows the lever arm to pivot in a vertical plane with the pivot point being below said mirror head, a seam guide is attached to said lever arm such that the seam guide is vertically aligned with said mirror head when the lever arm is oriented substantially vertically, and a tension means capable of maintaining said lever arm in a substantially vertical orientation.

2. A device for evaluating wrinkles in a double rolled seam according to claim 1 wherein the means for attachment comprises a pivot member which is attached directly to the sidewall of the seam projector.

3. A device for evaluating wrinkles in a double rolled seam according to claim 1 wherein the means for attachment comprises a pivot member which is attached to an "L" shaped mounting member which in turn is attached to a bottom wall of the base portion of the seam projector.

4. A device for evaluating wrinkles in a double rolled seam according to claim 2 wherein the tension means is a coil spring.

5. A device for evaluating wrinkles in a double rolled seam according to claim 3 wherein the tension means is a coil spring.

6. A system for evaluating wrinkles in a double rolled seam comprising:
    (a) a seam projector having a projection screen and a base portion having a mirror head located on a sidewall thereof;
    (b) a seam holding device comprising a lever arm which is attached to said base portion of said seam projector by means for attachment which allows the lever arm to pivot in a vertical plane with the pivot point being below said mirror head, a seam guide is attached to said lever arm such that the seam guide is vertically aligned with said mirror head when the lever arm is oriented substantially vertically, and a tension means capable of maintaining said lever arm in a substantially vertical orientation: and
    (c) a nomograph which is placed over the projection screen of the screen projector for evaluating the severity of wrinkles.

7. A system for evaluating wrinkles in a double rolled seam according to claim 6 wherein the means for attachment comprises a pivot member which is attached directly to the sidewall of the seam projector.

8. A system for evaluating wrinkles in a double rolled seam according to claim 6 wherein the means for attachment comprises a pivot member which is attached to an "L" shaped mounting member which in turn is attached to a bottom wall of the base portion of the seam projector.

9. A system for evaluating wrinkles in a double rolled seam according to claim 7 wherein the tension is a coil spring.

10. A system for evaluating wrinkles in a double rolled seam according to claim 8 wherein the tension means is a coil spring.

* * * * *